United States Patent [19]
Baran et al.

[11] Patent Number: 5,455,877
[45] Date of Patent: Oct. 3, 1995

[54] MULTI-CHANNEL WAVELENGTH-ROUTING SWITCH USING ACOUSTO-OPTIC POLARIZATION CONVERTERS

[75] Inventors: Jane E. Baran, Metuchen; Janet L. Jackel, Holmdel, both of N.J.

[73] Assignee: Bell Communications Research, Inc., Livingston, N.J.

[21] Appl. No.: 330,040

[22] Filed: Oct. 27, 1994

[51] Int. Cl.$^6$ .............................. G02B 6/14; G02F 1/11
[52] U.S. Cl. ................ 385/11; 385/7; 359/285; 359/308
[58] Field of Search ................... 385/1, 2, 7, 8, 385/11, 4, 9; 359/285, 287, 305, 308

[56] References Cited

U.S. PATENT DOCUMENTS

| | | | |
|---|---|---|---|
| 4,086,484 | 4/1978 | Steensma | 385/1 X |
| 4,793,676 | 12/1988 | Risk | 385/1 |
| 5,002,349 | 3/1991 | Cheung et al. | 385/1 |
| 5,218,653 | 6/1993 | Johnson et al. | 385/11 |
| 5,400,171 | 3/1995 | Song | 359/285 |

OTHER PUBLICATIONS

Voges et al., "Integrated Optic Devices on LiNbO$_3$ for Optical Communications", *Journal of Lightwave Technology*, vol. LT–5, Sep. 1987, pp. 1229–1237.

Frangen et al., "Integrated Optical, Acoustically Tunable Wavelength Filter", *Electronic Letters*, vol. 25, Nov. 1989, pp. 1583–1584.

*Primary Examiner*—Rodney B. Bovernick
*Assistant Examiner*—Hemang Sanghavi
*Attorney, Agent, or Firm*—Leonard Charles Suchyta; Stephen M. Gurey; James W. Falk

[57] ABSTRACT

Acousto-optic polarization converters can be used as the primary optical components in a multi-channel wavelength-routing switch (101). Switching efficiency is decreased and the polarization converted wavelength channels are shifted towards each other, however, when closely neighboring channels are selected simultaneously. This degradation has serious consequences for many applications of the acousto-optic polarization converter. By applying counterpropagating acoustic waves from opposite ends of a converter (400) and using an acoustic absorber (417) to separate the left and right sides of the converter at a defined coupler crossover length, $L_x$, this deleterious degradation is substantially reduced. Specifically, by separating the primary acousto-optic interaction regions for the right propagating acoustic waves and the optical signal which polarization is to be converted, from the primary acousto-optic interaction regions for the left propagating acoustic waves and that same optical signal, so that adjacent closely neighboring wavelength channels are converted in opposite sides of the converter, channel shifting is reduced. Further, by using a partial absorber at the crossover length, $L_x$, to separate the left and right converter sides, a flattened passband is created which decreases the consequences of any residual channel shifting.

10 Claims, 4 Drawing Sheets

FIG. 7 ns using series. The shape and depth of the rejection band is critical when the converter is used as a switch where a small increase in cross-state loss results in a large increase in bar-state crosstalk.

MULTI-CHANNEL WAVELENGTH-ROUTING SWITCH USING ACOUSTO-OPTIC POLARIZATION CONVERTERS

GOVERNMENT RIGHTS

This invention was made with Government support under Agreement No. MDA972-92-H-0010 awarded by ARPA. The Government has certain rights in the invention.

BACKGROUND OF THE INVENTION

This invention relates to acousto-optic polarization converters, and more particularly, to the use of acousto-optic polarization converters in a multi-channel wavelength-routing switch.

Acousto-optic polarization converters are well known in the art. In such prior art converters, a transducer of interdigitated electrodes is formed at the surface of a piezo-electrical material and is electrically driven by an RF-frequency signal to launch an acoustic wave at the surface of the material. For an appropriate crystal orientation and direction of propagation, the surface acoustic wave provides for quasi-phase-matched conversion between orthogonally polarized eigenstates having substantially different refractive indexes. The interaction rotates the polarization of that wavelength of light for which the momentum mismatch between polarization states nearly exactly matches the acoustic wave momentum. Placing the converter between crossed broad-band polarizers allows it to operate as a narrow-band acousto-optic tunable filter (AOTF). Alternatively, a device consisting of an input and output polarization beam splitter and two similarly driven acousto-optic polarization converters functions as a switch, which directs polarization transformed wavelengths to one output port and untransformed wavelengths to a second output port.

Much effort has been directed in the prior art to improving the passband transmission characteristics of acousto-optic polarization converters. One major concern of the prior art has been reducing the magnitude of the side lobes in the passband, which deleteriously affect the performance of the converter as either a filter or as a switch. Various apodized acousto-optic converters are disclosed in the prior art which redistribute the acoustic energy interaction with the optical signal in such a manner that the undesirable side lobes am reduced. For example, in U.S. Pat. No. 5,218,653 to Johnson et al., incorporated herein by reference, a polarization converter is disclosed with an apodized acoustic waveguide in which a surface acoustic wave is launched in one surface acoustic waveguide which is directionally coupled to a second surface acoustic waveguide in the middle of which runs an optical waveguide. The interaction length in the second acoustic waveguide is such that the power density of its acoustic wave spatially varies from a minimum to a maximum and back to a minimum. This length is one-half the coupling length, $L_c$, of the waveguide, which is a function of the characteristics of the acoustic waveguides. Thereby, the acoustic energy in the second acoustic waveguide is apodized and the side lobes of the interaction with the optical signal are reduced.

Also of concern is the "flatness" of the passband. The most desirable passband has unity transmission over the wavelength to be passed, and zero transmission elsewhere; the corresponding rejection band is both deep and broad, i.e,. essentially no light is transmitted into unselected channels. Such a passband can accommodate the inevitable variations in signal wavelength, and will not narrow when several filters are used in series. The shape and depth of the rejection band is critical when the converter is used as a switch where a small increase in cross-state loss results in a large increase in bar-state crosstalk.

Co-pending patent application Ser. No. 08/264,674 filed Jun. 23, 1994, which is incorporated herein by reference, discloses a passband-flattened apodized acousto-optic polarization converter that is based on an extension and modification of the afore-noted polarization converter disclosed in U.S. Pat. No. 5,218,653. In this converter, passband flattening is achieved by introducing a region in which the sinusoidally varying acoustic amplitude is both phase-reversed and diminished. This is accomplished by placing a partial acoustic absorber rather than a complete absorber at a crossover length, $L_x$, equal to one-half the coupling length, and increasing the interaction length of the converter to $2L_x$.

As noted, the shape, depth and location of the rejection band is of particular concern when acousto-optic polarization converters are used to switch wavelengths. This is best explained with reference to FIG. 1, which shows a plan view of a prior art optical switch 101 incorporating two essentially identical and similarly driven apodized acousto-optic polarization converters 102 and 103, of the type described in afore-noted U.S. Pat. No. 5,218,653. An input optical signal of any polarization is inputed on fiber 104 to a polarizing beamsplitter 105, which splits the input signal into two orthogonally polarized output signals on polarizing maintaining fibers 106 and 107. The orthogonally polarized signals on these two fibers are then inputed to polarization converters 102 and 103, respectively. Depending upon the wavelength of the optical input signal and the wavelength of the surface acoustic wave applied to the first surface acoustic waveguides 114 and 115 in each converter, each polarization converter either converts or doesn't convert the polarization of its input signal to the opposite polarization. If the polarizations are both not convened by the converters 102 and 103, then the light in each of the polarizing maintaining fibers 108 and 109 at the outputs of converters 102 and 103, respectively, has the same polarization as in its corresponding input fiber. Output polarizing beamsplitter 110 then combines these oppositely polarized signals on fibers 108 and 109 to produce a signal at the first switch output on output fiber 111. If, on the other hand, converters 102 and 103 convert polarizations, then the light in each of the polarizing maintaining fibers 108 and 109 is opposite in polarization to that in its corresponding input fiber and beamsplitter 110 combines these oppositely polarized signals to produce a signal on the second switch output on output fiber 112. Thus, depending on its wavelength, an input signal is either not switched and is outputted on fiber 111, or is switched and is outputted on fiber 112.

Figure 2A:
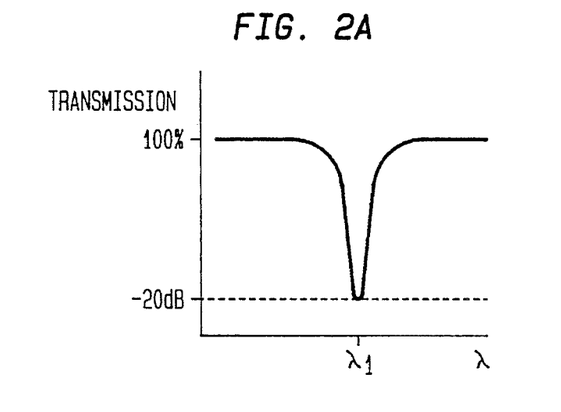
FIGS. 2A and 2B show the switched and unswitched transmissions of the switch in FIG. 1.
Figure 2B:
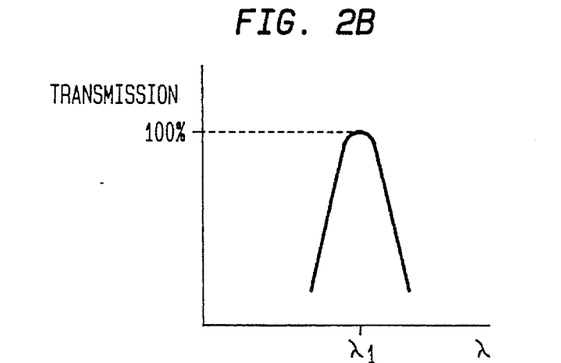

FIGS. 2A and 2B shows the unswitched (bar-state) and switched (cross-state) transmission versus wavelength characteristics of switch 101. As can be noted in FIG. 2A, all wavelengths are passed to the unswitched output except for wavelengths within the narrow band surrounding the wavelength $\lambda_1$ at which polarization conversion takes place. As noted, this optical wavelength, $\lambda_1$, is determined by a corresponding acoustic wave of wavelength, $\Lambda_1$, imposed on the first acoustic waveguides 114 and 115 in converters 102 and 103, respectively. At $\lambda_1$, transmission is shown to be 20 dB below the 100% transmission at other wavelengths. Similarly, the switched output in FIG. 2B shows transmission at 100% only at a narrow band surrounding $\lambda_1$, and falls rapidly outside the band. An input channel on input fiber 104 at wavelength $\lambda_1$ thus has most of its optical energy switched to the second switch output on fiber 112, while simultaneous optical channels at other wavelengths remain unswitched and pass to the first switch output on fiber 111.

Figure 1:
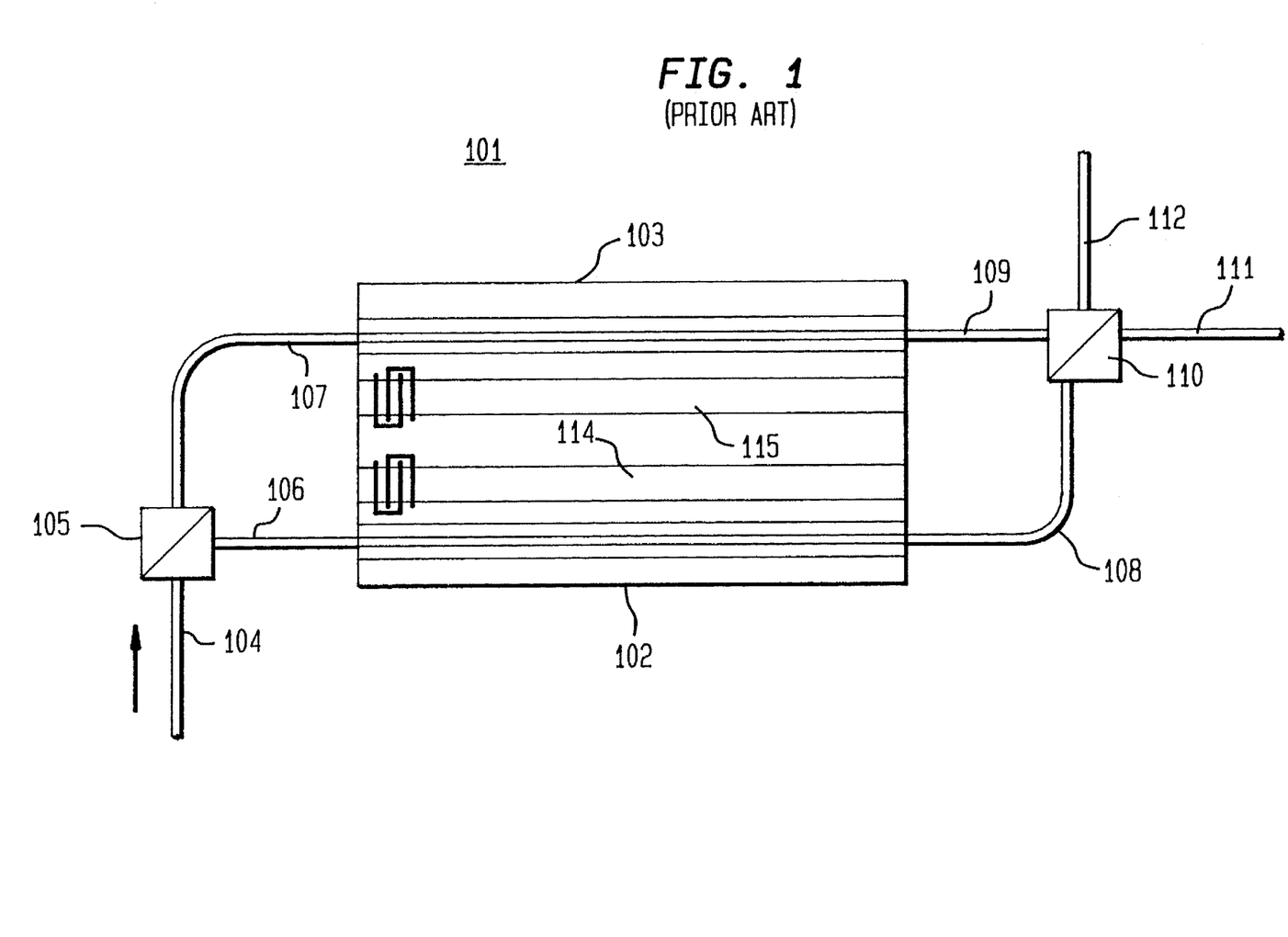
FIG. 1 is a plan view of a prior art optical switch using two acousto-optic polarization converters.

In an optical network, in addition to the multiple wavelength channels inputed to switch 101 on fiber 104, additional channels at the same or different wavelengths are likely to also be inputed to a second input of polarizing beamsplitter 105 on a second input fiber 113. These channels at other than the switching wavelength $\lambda_1$ pass unswitched to the second switch output on fiber 112, while a channel at $\lambda_1$ is switched to the first switch output on fiber 111. Switch 101 thus acts to pass all channels on its first and second inputs to its first and second outputs, respectively, while switching channels at $\lambda_1$ to opposite outputs.

When switching efficiency at a particular wavelength is high at approximately 99% (i.e., only 1% of the light from an input channel goes into an output channel that shouldn't have any signal at that particular wavelength), crosstalk between channels at the same wavelength will be low. If switching efficiency should decrease, to 90% for example, then 10% of the light is improperly directed; this is a significant increase in improperly directly light that will interfere with a proper signal at that wavelength and deleteriously affect crosstalk performance. Thus the depth of the bar-state (FIG. 2A) is critical in switch performance. Also critical to switch performance is the width of the rejection band which must be across the entire wavelength defined channel in order to accommodate expected channel variations.

Figure 3:
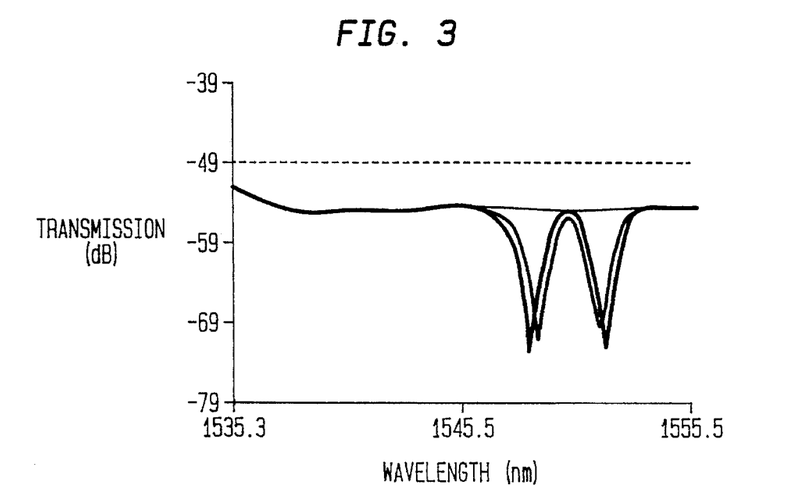
FIG. 3 shows the measured bar-state transmission of an acousto-optic converter when two channels separated by 4 nm are switched and when each channel is separately switched.

Both rejection depth and width and/or placement of the rejection band become critical factors when the acousto-optic polarization converter is used as a multichannel wavelength-routing switch. In 5particular, when switch 101 is used to simultaneously switch several closely-spaced wavelengths, all lying withing a wavelength channel, by imposing multiple acoustic waves of different wavelengths on the acoustic waveguides 114 and 115, switching efficiency has been found to decrease. Specifically, it has been experimentally determined that when neighboring channels which are close in wavelength are simultaneously selected for switching, the depth of rejection of their bar-state transmissions decreases. Furthermore, the channels are shifted toward each other by a small, but potentially harmful amount. FIG. 3 shows the measured bar-state transmission of an acousto-optic converter when two channels separated by 4 nm are switched together and when each channel is separately switched. The reduction in the depth of rejection of each channel when simultaneously switched and the shift of channel positions toward each other can be noted.

It was experimentally noted that closely spaced channels always move towards each other. In addition, it was also experimentally noted that by shifting the wavelength of the second channel far away from the wavelength of the first channel, the first channel returns to its unperturbed position. These factors led to the conclusion that the cause of the shifts is not thermal, which would be independent of channel spacing and would move all channels in the same direction. Rather, the channel shift can quantitatively be attributed to the fact that the response of the polarization to the acoustic amplitude is not linear (i.e., a change in acoustic amplitude does not produce a proportional change in the polarization conversion, and indeed, in some cases an increase in acoustic amplitude can produce a decrease in the target polarization).

The consequences of these shifts and of the reduced rejection depth can be particularly severe in networks in which a wavelength channel (rather than a single set of wavelengths) is defined. Any realistic application requires that the switch must maintain some minimum performance (e.g. worst-case crosstalk) over a finite bandwidth. In a switch having a response such as shown in FIG. 3, crosstalk, and changes in crosstalk as the channel shifts both strongly depend upon where in that channel any given wavelength lies. In cases where two separate signals, both having wavelengths lying in the same channel, are expected to cross paths in a switch, the resulting increase in crosstalk cannot be eliminated using techniques such as dilation, and can make the system unworkable.

An object of the present invention is provide closely spaced multi-channel wavelength-routing using acousto-optic polarization converters.

SUMMARY OF THE INVENTION

In accordance with the present invention, the problems in the prior art associated with the simultaneous switching of multiple closely-spaced optical wavelengths in a switch comprising at least one apodized acousto-optic polarization converter are eliminated by employing a two-front attack. First, the converter device is separated into two halves, and every other optical wavelength is polarization converted in each half. The resultant increased channel separation of the wavelengths being polarization converted in each half greatly reduces the undesirable channel shift of more closely spaced channels. Second, the consequences of the remaining channel shifts are decreased by creating a flattened passband using the techniques of the afore-noted co-pending patent application.

Specifically, in the polarization converter of the present invention, counterpropagating acoustic waves are axially launched towards each other from each end of a passband flattened apodized polarization coverter of the type described in the afore-noted co-pending patent application. As is the length of the prior art converter, the interaction length of the converter of the present invention is equal to twice the afore-defined cross-over length, $L_x$, and an acoustic absorber is axially disposed at the coupler's midpoint, at position $x=L_x$. The primary acousto-optic effect for the right-traveling copropagating acoustic waves having frequencies corresponding to the further spaced wavelengths to be polarization converted takes place in the left side of the converter. Similarly, the primary acousto-optic effect for copropagating left-traveling acoustic waves having frequencies corresponding to the alternate wavelengths to be polarization converted takes place in the right side of the converter. The undesirable channel shifting effect created when too closely spaced wavelengths are simultaneously converted in a common physical space is thus substantially reduced. When the midpoint acoustic absorber passes a small fraction of either the right or left propagating acoustic amplitudes to the opposite half, a desirable overall flattened optical passband is produced, with a broader bar-state rejection. Advantageously, the polarization converter of the present invention is no longer in length than the prior art single passband flattened acousto-optic polarization converter.

DETAILED DESCRIPTION

Figure 4:
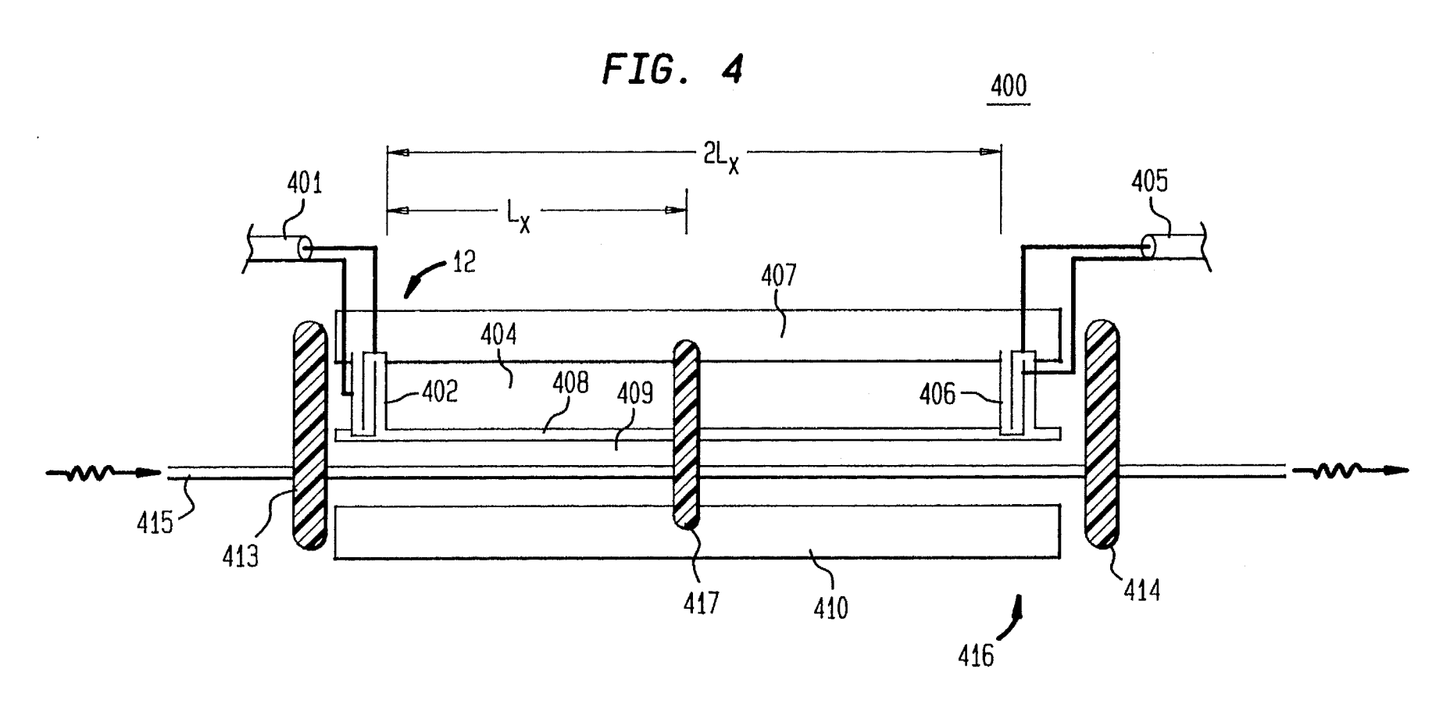
FIG. 4 is a plan view of an acousto-optic polarization converter of the present invention.

An embodiment of the polarization converter 400 of the present invention is illustrated in plan view in FIG. 4. A first coaxial line 401 feeds a first RF signal through a suitable unillustrated matching network to a first interdigitated transducer 402, which launches a first surface acoustic wave at one end of a launching acoustic waveguide 404 which it overlies, which first acoustic wave propagates axially from left to right. A second coaxial line 405 feeds a second RF signal through a suitable unillustrated matching network to a second interdigitated transducer 406, which launches a counterpropagating second surface acoustic wave at the opposite end of acoustic waveguide 404, which second acoustic wave propagates axially from fight to left. The launching acoustic waveguide 404 is defined on one side by a surface acoustic wave barrier 407 and on the other side by a narrow surface acoustic wave gap 408 separating it from an interaction acoustic waveguide 409, defined on its other side by another surface acoustic wave barrier 410. An optical waveguide 415 runs through the middle of the interaction acoustic waveguide 409 and receives an optical signal to be polarization converted at the wavelengths corresponding to the frequencies of the acoustic waves launched at both ends of acoustic waveguide 404. Waveguides 404 and 409 are formed on a common piezo-electric substrate 416.

Each of the acoustic waveguides 404 and 409 is single moded, and acoustic amplitude is transferred, commencing at each end of the launching waveguide 404, to the interaction waveguide 409 from each of the counterpropagating acoustic waves. Acoustic power is gradually transferred in both directions into the interaction waveguide 404, and after reaching a maximum, is transferred back to the launching waveguide. The acoustic waves interact with the light in optical waveguide 415 via the acousto-optic effect, to transform the polarization of the light being transmitted in the optical waveguide at the optical wavelengths that correspond to the wavelengths of the applied acoustic waves. The coupling coefficient between acoustic waveguides 404 and 409, equal to $2\pi/L_c$, depends exponentially on the gap 408 between the two acoustic waveguides because the evanescent surface acoustic waves decay exponentially into the gap 408. The coupling length, $L_c$, is defined as the length that would be required for the acoustic amplitude of an applied acoustic wave to cross-over from a first acoustic waveguide to a second acoustic waveguide and return to the first and cross-over and return again with a 180° shift in phase. $L_c$ is a function of the width of the acoustic waveguide regions 404 and 409, the separation of the waveguides defined by the gap 408, and how strongly the acoustic waveguides are confined by the barrier regions 407 and 410. The converter geometry, and from that the coupling length $L_c$, is chosen to give the desired passband width, $\propto 1/L_c$. For a given physical waveguide geometry, $L_c$ can be measured by an acoustic profilometer.

The interaction region through which the counterpropagating acoustic waves and the optical signal interact is the axial region between transducers 402 and 406, and is equal to twice the cross-over length, $2L_x$, or equivalently, by definition, $L_c$. Each transducer effectively serves to absorb part of the acoustic energy propagating towards it from the opposite end. Complete acoustic absorbers 413 and 414 are disposed across waveguides 404 and 409 to the left and right, respectively, of transducers 402 and 406, to completely absorb all acoustic energy and to prevent any back-propagating surface acoustic waves from either of the transducers. An acoustic absorber 417 is disposed at the axial midpoint of the converter across the launching and interaction waveguides 404 and 409, respectively, at the cross-over length, $L_x$. At this point the acoustic waves in the interaction waveguide traveling from fight to left and from left to right have coupled back into the launching waveguide. If the acoustic absorber passes a fraction, $\delta$, of the acoustic amplitude then the acoustic amplitude in the interaction acoustic waveguide 409 is given by:

$$A_{L/R}(x)=A_{L/R\text{-}in}\sin(\pi x/L_x) \quad x\leq L_x \qquad (1)$$

$$A_{L/R}(x)=\delta A_{L/R\text{-}in}\sin(\pi x/L_x) \quad x>L_x \qquad (2)$$

for an acoustic wave traveling axially from left to right (L/R). Similarly, for the acoustic wave traveling axially from right to left (R/L), the acoustic amplitude in the interaction acoustic waveguide 409 is given by:

$$A_{R/L}(x)=A_{R/L\text{-}in}\sin(\pi[2L_x-x]/L_x) \quad x\geq L_x \qquad (3)$$

$$A_{R/L}(x)=\delta A_{R/L\text{-}in}\sin(\pi[2L_x-x]/L_x) \quad x<L_x \qquad (4)$$

Figure 5:
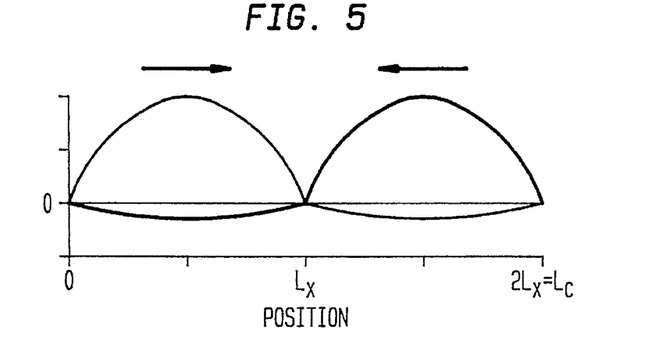
FIG. 5 shows the acoustic amplitude in the acoustic waveguide in which the acousto-optic effect occurs as a function of axial position, for acoustic waves introduced from both ends.

FIG. 5 shows the acoustic amplitude in the interaction waveguide 409 as a function of the axial position, x, for both the acoustic waves introduced from the left and fight ends for a small value of $\delta$.

When the acoustic absorber 417 absorbs all the acoustic wave, i.e., $\delta=0$, the structure functions as two independent apodized polarization converters. Since a complete absorber 417 divides the device into two independent polarization converters, interaction between channels is eliminated. If the first acoustic wave, driven by transducer 402 on the left, has completely transformed the polarization for light at a given optical wavelength, a second acoustic wave, driven by transducer 406 on the right, can reconvert a small amount to the original polarization. The effect, which is proportional to the sidelobe amplitude, is only additive in this case, however, and while the maximum polarization conversion is reduced, there is no channel shift. Advantageously, using the device in FIG. 4 with a complete absorber rather than using two separate devices enables all wavelengths to be switched in a single device with a concomitant minimization of coupling losses that would result from separate devices.

When acoustic absorber 417 is a partial rather than a complete absorber, the wavelength response is advantageously flattened. The acoustic waves in the device are described by equations (1) through (4), with $\delta\neq0$. As noted, the envelope function is shown in FIG. 5. An acoustic amplitude of this form produces a flattened optical passband, with a broader bar-state rejection For $x \leq L_x$, where most of the polarization conversion takes place for an optical wavelength which is to be converted using the acoustic wave introduced at the left, any acoustic waves introduced from the right, which provide polarization conversion for different optical wavelengths, have small amplitude. Polarization conversion for the neighboring optical wavelengths are not entirely decoupled, but the interaction is small. Some channel shifts are therefore to be expected.

EXAMPLE

A multi-wavelength acousto-optic polarization converter in accordance with the present invention was fabricated and tested for RF frequencies of 175±2 MHz and optical wavelength of approximately 1.5 μm in LiNbO$_3$. The acoustic barriers 407 and 410 and the gap 408 were formed following the technique disclosed by Frangen et al. in "Integrated Optical, Acoustically Tunable Wavelength Filter," *Electronics Letters*, volume 25, 1989, pp. 1583–1584. Stripes of Ti were deposited along the y-direction on an x-cut LiNbO$_3$ substrate 416 to a thickness of 180 nm and patterned into the barriers 407 and 410 and gap 408. The barriers 407 and 410 had widths of 150 μm and the acoustic waveguides 404 and 409 had widths of 100 μm separated by a gap 408 of 20 μm. $L_x$ was 18 mm, with the interaction length of the converter being 36 mm. The titanium was diffused into the LiNbO$_3$ following the technique disclosed by Voges et al. in "Integrated-Optic Devices on LiNbO$_3$ for Optical Communication," *Journal of Lightwave Technology*, volume LT-5, 1987, pp. 1229–1237. Specifically, the substrate was placed in a platinum crucible and heated in an air ambient to 1050° C. After a first diffusion step lasting for approximately 20 hours, two additional stripes of Ti having a thickness of 95 nm and a width of 8 μm were deposited in the middle of the two acoustic waveguides 404 and 409. One corresponded to the illustrated optical waveguide 415. The other was placed in the center of the launching acoustic waveguide 404 in order to advantageously make it symmetric with the interaction acoustic waveguide 409 and was not otherwise used. Then another diffusion step was performed for 10 hours at the same temperature. The result is a shallow optical waveguide in a deeper acoustic waveguide.

The transducers 402 and 406 had 20 pairs of fingers on 20 μm periods with widths and separations of 5 μm. The fingers were inclined at 5° from the perpendicular of launching waveguide 404 on x-cut LiNbO$_3$, in accordance with the teachings in the patent of Cheung et al. in U.S. Pat. No. 5,002,349. The transducers 402 and 406 were formed by depositing a 15 nm adhesion layer of Ti and then 150 nm of Au and was designed so that the finger electrodes did not cross the interaction waveguide 409. RF power was coupled into the transducers 402 and 406 through 180 nH series inductors. A partial acoustic absorber 407 was formed by placing a small amount of rubber cement or photoresist over the acoustic waveguides. Almost any value of δ can be created in this way, although reproducibility is difficult when the absorber is placed by hand. It would be expected that reproducibility can be improved using photolithographic techniques. The complete acoustic absorbers 413 and 414 at each end of the converter were formed by depositing a 1 mm width of rubber cement over and transverse to the acoustic waveguides 404 and 409.

The behavior of polarization converters constructed as described above were measured by introducing light of 1530–1560 nm from an erbium-doped fiber amplifier (EDFA) into the optical waveguide 415, driving the transducers 402 and 406 with plural constant RF frequencies (which could each be varied over the range 172–176 MHz, to select plural optical wavelengths in the EDFA spectrum), and observing transmission in both the original polarization (bar-state) and the target polarization (cross-state) using an optical spectrum analyzer. For characterization purposes, absorption could be monitored using transducer 406 when it wasn't being used to introduce a left propagating acoustic wave to the converter.

Figure 6:
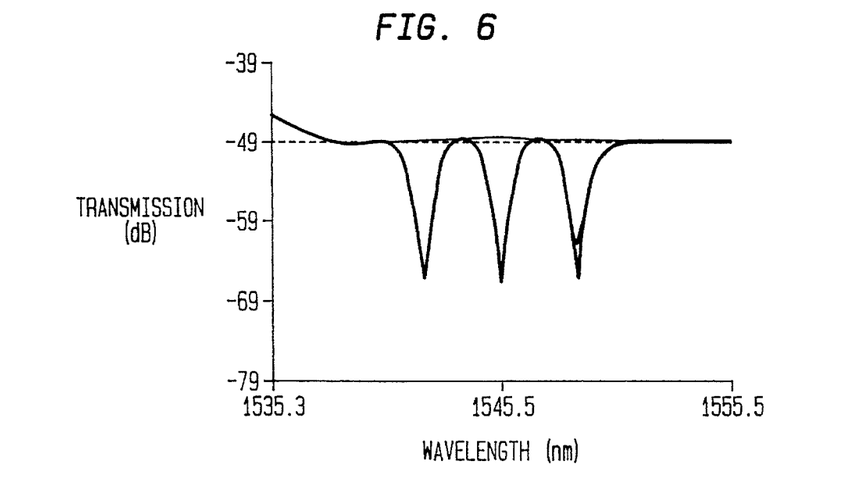
FIG. 6 shows the experimentally measured bar-state transmission for the polarization coverter of FIG. 4, which uses a complete acoustic absorber between each half of the converter.

FIG. 6 shows experimental results of using two copropagating waves at an 8 nm separation, combined with one counterpropagating wave at a wavelength in the middle, 4 nm between the two copropagating waves, with the converter of FIG. 4 in which acoustic absorber 417 is a complete absorber (δ=0). There is only a minimal shift due to the interaction of the copropagating 8-nm-separated channels, and only a small decrease in contrast for one of the channels. It was experimentally found that the decreased rejection is proportional to the sidelobe intensity, which effect can be minimized by reducing sidelobes or locating them away from the wavelengths of interest.

Figure 7:
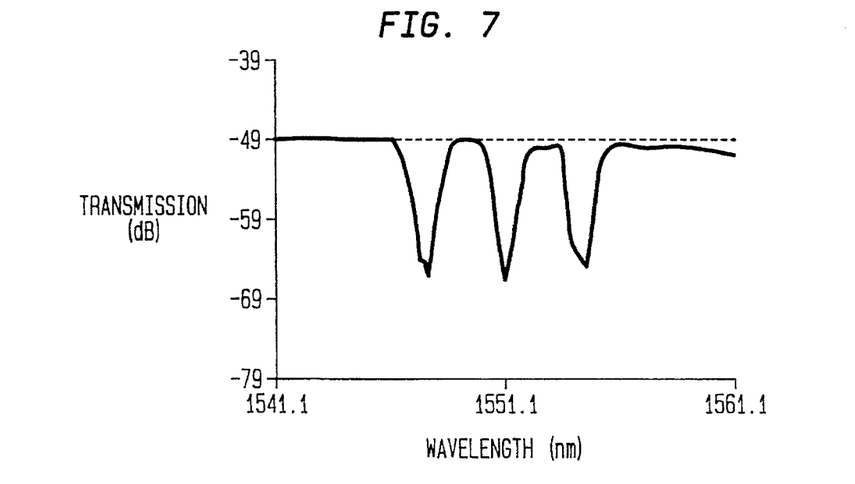
FIG. 7 shows the experimentally measured bar-state transmission for the polarization converter of FIG. 4, which uses a partial absorber between each half of the converter.

FIG. 7 shows experimental results in which acoustic absorber 417 is a partial absorber, with δ≈0.15, where as in FIG. 6, three channels, separated by 4 nm, are driven simultaneously, two from one end and one from the other. While there is some distortion of the channels noted, the maximum bar-state rejection is nearly as good (−15 dB) as seen in FIG. 6. More importantly, the channel widths are substantially greater, permitting switching over a broad channel, rather than limiting the region of acceptable crosstalk to a narrow wavelength region. Best results can be achieved with 0.10≦δ≦0.20, corresponding to between 99% and 96% absorption.

As prediced by simulations, oscillation in the depth of maximum bar-state rejection has been observed, at a frequency given by the difference by two acoustic frequencies. For two copropagating acoustic drives, the amplitude of the oscillation depends on both the frequency separation and, to a lesser, extent, the sidelobe amplitude. For acoustic drives propagating in opposite direction, the oscillation is smaller and depends only on sidelobe amplitude.

The converter of the present invention advantageously provides switching of multiple wavelengths on a single device rather than requiring each wavelength to be separated, switched on separate devices, and then recombined. With such a prior art approach, many more devices are required, each of which contributes to the total switching loss. Since much of the loss occurs at the fiber-device interface, losses can be limited by keeping as much switching as possible on a single substrate, as is done in the device of the present invention. As previously noted, the device of the present invention has the same length as a single passband-flatted filter. Device length is a critical issue for acousto-optic polarization converters, in part because the length and passband width are inversely related, but in addition because the length of devices cannot be increased indefinitely. Passband-flattened filters having the 1–2 nm wavelength channel widths needed for many applications are close to the maximum length that can be fabricated today.

By using two polarization converters of the present invention, as described hereinabove, in a switch structure as shown in FIG. 1, multiple channels at different wavelengths can be simultaneously switched without the deleterious effect of channel shifting and decreased rejection depth. Thus, in the multi-channel wavelength routing switch of FIG. 1, in accordance with the present invention, acoustic wavelengths are simultaneously impressed from the left and right upon polarization converters 102 and 103 in alternating frequency, wherein converters 102 and 103 are each as described hereinabove in conjunction with FIG. 4.

The above-described embodiment is illustrative of the principles of the present invention. Other embodiments can be devised by those skilled in the art without departing from the spirit and scope of the present invention.

What is claimed is:

1. An acousto-optic polarization converter for converting the polarization of light at plural optical wavelengths, comprising:

a first acoustic waveguide formed in a piezo-electric substrate;

a second acoustic waveguide formed in said substrate and separated from said first acoustic waveguide in an interaction region by a gap supporting only evanescent acoustic waves and across which acoustic power is coupled between said first and second acoustic waveguides along an interaction length;

first launching means disposed at a first axial end of said first acoustic waveguide for launching a first acoustic wave at a first acoustic frequency into said interaction region of said first acoustic waveguide for transmission in a first axial direction;

second launching means disposed at a second opposite axial end of said first acoustic waveguide for launching a second acoustic wave at a second acoustic frequency into said interaction region of said first acoustic waveguide for transmission in an axial direction opposite to said first direction;

an optical waveguide formed in and extending along the interaction region of said second acoustic waveguide; and an acoustic absorber formed over said first and second acoustic waveguides separating said interaction region into first and second portions each substantially equal in length to a crossover length such that said first acoustic wave propagating in said first direction in the first portion and said second acoustic wave propagating in said opposite direction in said second portion are each separately transferred from said first acoustic waveguide to said second acoustic waveguide and back to said first acoustic waveguide in their respective portions, wherein the polarization of light transmitted in said optical waveguide is converted to an opposite polarization at optical wavelengths corresponding to said first and second acoustic frequencies.

2. An acousto-optic polarization converter in accordance with claim 1 wherein said acoustic absorber is a partial acoustic absorber.

3. An acousto-optic polarization converter in accordance with claim 2 where said partial acoustic absorber absorbs between about 96% and 99% of the power of the incident acoustic waves from both said first and second directions.

4. An acousto-optic polarization converter in accordance with claim 1 wherein said first launching means launches a plurality of acoustic waves at a plurality of acoustic frequencies corresponding to a plurality of optical wavelengths, and said second launching means launches a plurality of acoustic waves at a plurality of different acoustic frequencies corresponding to a plurality of different optical wavelengths.

5. An acousto-optic polarization converter in accordance with claim 4 wherein said plurality of acoustic frequencies and said different plurality of acoustic frequencies are selected so that said respective corresponding pluralities of optical wavelengths and different optical wavelengths alternate in wavelength.

6. An optical switch for switching optical channels at plural optical wavelengths, comprising:

an input beamsplitter means for splitting an input optical signal comprising multiple optical channels into two orthogonally polarized optical signals, first and second substantially identical polarization converters for separately converting the polarizations of each of said two orthogonally polarized optical signals at said plural optical wavelengths, each polarization converter comprising:

a first acoustic waveguide formed in a piezo-electric substrate;

a second acoustic waveguide formed in said substrate and separated from said first acoustic waveguide in an interaction region by a gap supporting only evanescent acoustic waves and across which acoustic power is coupled between said first and second acoustic waveguides along an interaction length;

first launching means disposed at a first axial end of said first acoustic waveguide for launching into said interaction region of said first acoustic waveguide at least one acoustic wave at an acoustic frequency that corresponds to at least one of said plural optical wavelengths for transmission in a first axial direction;

second launching means disposed at a second opposite axial end of said first acoustic waveguide for launching into said interaction region of said first acoustic waveguide at least one acoustic wave at an acoustic frequency that corresponds to at least one other of said plural optical wavelengths for transmission in an axial direction opposite to said first direction;

an optical waveguide formed in and extending along the interaction region of said second acoustic waveguide for transmitting one or the other of said orthogonally polarized optical signals; and an acoustic absorber formed over said first and second acoustic waveguides separating said interaction region into first and second portions each substantially equal in length to a crossover length such that said at least one acoustic wave propagating in said first direction in the first portion and said at least one acoustic wave propagating in said opposite direction in said second portion are each separately transferred from said first acoustic waveguide to said second acoustic waveguide and back to said first acoustic waveguide in their respective portions, the polarizations of both of said orthogonally polarized optical signals transmitted through the optical waveguides in said first and second polarizations converters being converted to opposite polarizations at optical wavelengths corresponding the acoustic frequencies of the acoustic waves propagating in both directions in both of said polarization converters; and output combining means for combining the orthogonally polarized optical signals transmitted through the optical waveguides in said first and second polarization converters to produce first and second optical output signals, the first optical output signal comprising those channels at wavelengths the polarizations of which are converted by said first and second polarization converters and the second optical output signal comprising channels at other wavelengths.

7. An optical switch in accordance with claim 6 wherein the acoustic absorber in each polarization converter is a partial acoustic absorber.

8. An optical switch in accordance with claim 7 wherein the partial acoustic absorber in each polarization converter absorbs between 96% and 99% of the power of the acoustic waves incident upon it from both directions.

9. An optical switch in accordance with claim 6 wherein in each of said polarization converters said first launching means launches a plurality of acoustic waves corresponding to a plurality of optical wavelengths, and said second launching means launches a plurality of acoustic waves at a plurality of different acoustic frequencies corresponding to a plurality of different optical wavelengths.

10. An optical switch in accordance with claim 10 wherein said plurality of acoustic waves and said different plurality of acoustic frequencies are selected so that said respective corresponding pluralities of optical wavelengths and different optical wavelengths alternate with each other.

\* \* \* \* \*